United States Patent
Liao

(10) Patent No.: US 6,244,131 B1
(45) Date of Patent: Jun. 12, 2001

(54) STEM FOR A BICYCLE

(75) Inventor: Jim Liao, Hsin Chu Hsien (TW)

(73) Assignee: Hsin Lung Accessories Co., Ltd. (TW)

( * ) Notice: Subject to any disclaimer, the term of this patent is extended or adjusted under 35 U.S.C. 154(b) by 0 days.

(21) Appl. No.: 09/313,022

(22) Filed: May 17, 1999

(51) Int. Cl.[7] .................................................. B62K 21/16
(52) U.S. Cl. ......................................... 74/551.3; 74/551.1
(58) Field of Search .............................. 74/551.1–551.8; 280/276

(56) References Cited

U.S. PATENT DOCUMENTS

| | | | | |
|---|---|---|---|---|
| 5,138,900 | * | 8/1992 | Hals ..................................... | 74/551.7 |
| 5,511,444 | * | 4/1996 | Clausen et al. ..................... | 74/551.2 |
| 5,678,458 | * | 10/1997 | Kao ..................................... | 74/551.1 |
| 5,752,711 | * | 5/1998 | Moreau ............................... | 280/276 |
| 5,755,141 | * | 5/1998 | Chen .................................... | 74/551.3 |
| 5,779,253 | * | 7/1998 | Lee ....................................... | 280/279 |
| 5,931,049 | * | 8/1999 | Tsai ..................................... | 74/551.3 |

\* cited by examiner

*Primary Examiner*—Vinh T. Luong
(74) *Attorney, Agent, or Firm*—Andrus, Sceales, Starke & Sawall, LLP

(57) ABSTRACT

An improved stem for a bicycle comprises a column member having a top end, a first pivot mechanism and a second pivot mechanism which are provided on the two sides of the top end respectively; a sleeve member for fixing a handlebar, having a rod therefrom which defines a third pivot mechanism and a fourth pivot mechanisms on the two sides thereof; respectively and a lateral member including a left connecting part and a right connecting part wherein each of the left and right connecting part has two ends each having a protruded engaging mechanism adapted to be pivotally attached to the first, second, third and fourth pivot mechanisms so that the lateral member can be pivotally adjusted through the first and second pivot mechanisms, and the sleeve member can be pivotally adjusted through the third and fourth pivot mechanisms.

7 Claims, 4 Drawing Sheets

STEM FOR A BICYCLE

BACKGROUND OF THE INVENTION

The present invention relates to an improved stem, and more particularly, to an improved stem for a bicycle which provides easy and convenient angle adjustment of the stem.

FIG. 1 shows a conventional stem for a bicycle, said stem comprising a lateral member 1, a column member 2 and a sleeve 3 wherein the lateral member 1 is securely attached on the upper portion of the column member 2. It can be readily appreciated that the angle between the column member 2 and the lateral member 1 is fixed, that is to say, it cannot be adjusted. In addition, the sleeve 3 which clamps a handlebar 4 is welded to the lateral member 1 and cannot be adjusted.

SUMMARY OF THE INVENTION

To overcome the drawback of the conventional stem, an object of the present invention is to provide an improved stem which provides easy and convenient angle adjustment of a stem.

To achieve the object mentioned above, the present invention provides an improved stem for a bicycle, which comprises a column member having a top end, a first pivot mechanism and a second pivot mechanism which are provided on the two sides of the top end respectively; a sleeve member for fixing a handlebar, having a rod therefrom which defines a third pivot mechanism and a fourth pivot mechanisms on the two sides thereof, respectively and a lateral member including a left connecting part and a right connecting part wherein each of the left and right connecting part has two ends each having a protruded engaging mechanism adapted to be pivotally attached to the first, second, third and fourth pivot mechanisms so that the lateral member can be pivotally adjusted through the first and second pivot mechanisms, and the sleeve member can be pivotally adjusted through the third and fourth pivot mechanisms.

BRIEF DESCRIPTION OF THE DRAWING

The above objects and advantages of the present invention will become more apparent by the following detailed description of a preferred embodiment thereof in conjunction with the accompanying drawings, in which.

DETAILED DESCRIPTION OF THE PREFERRED EMBODIMENT

Figure 1:
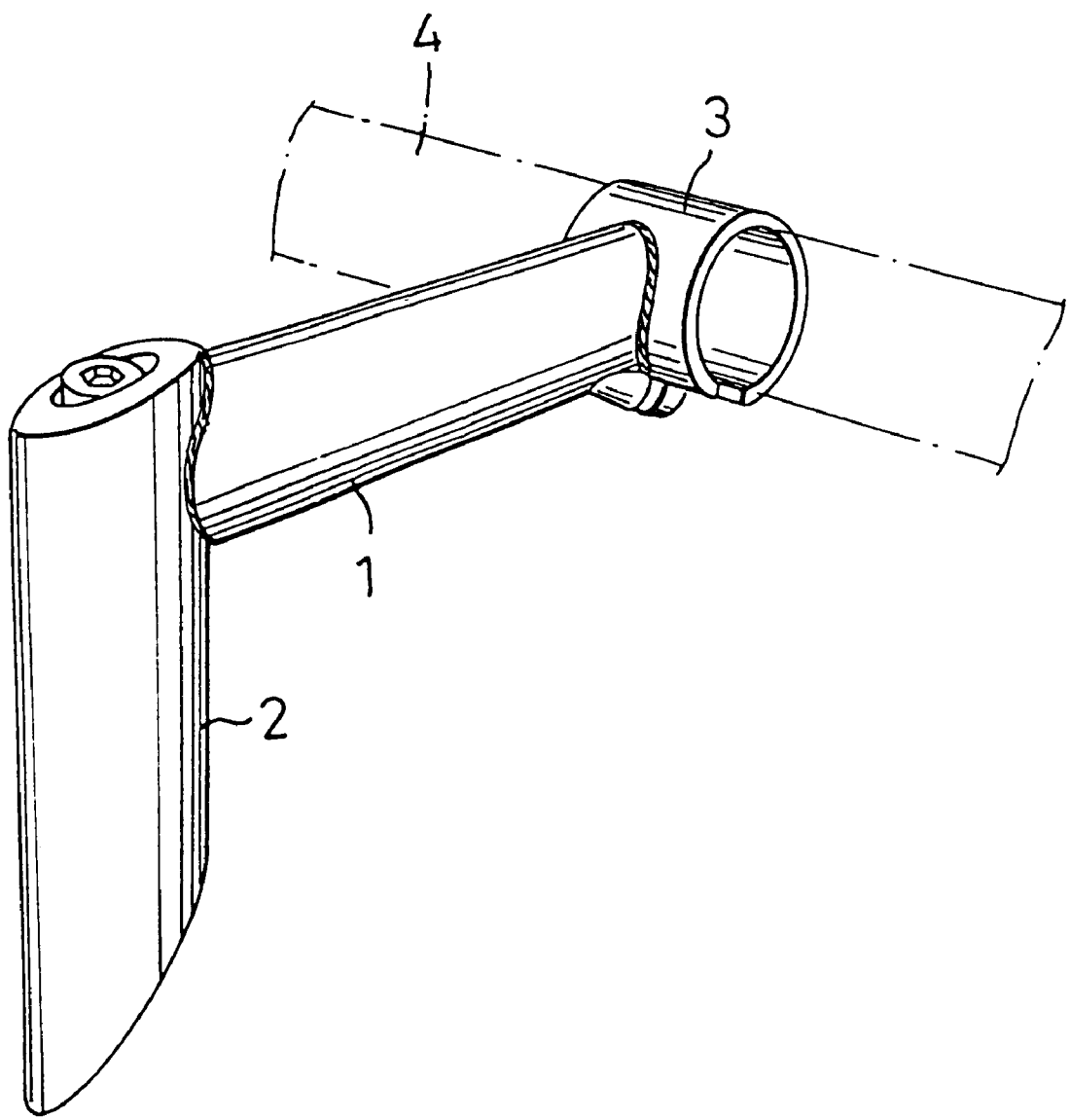
FIG. 1 is perspective view of a conventional stem for a bicycle.
Figure 2:
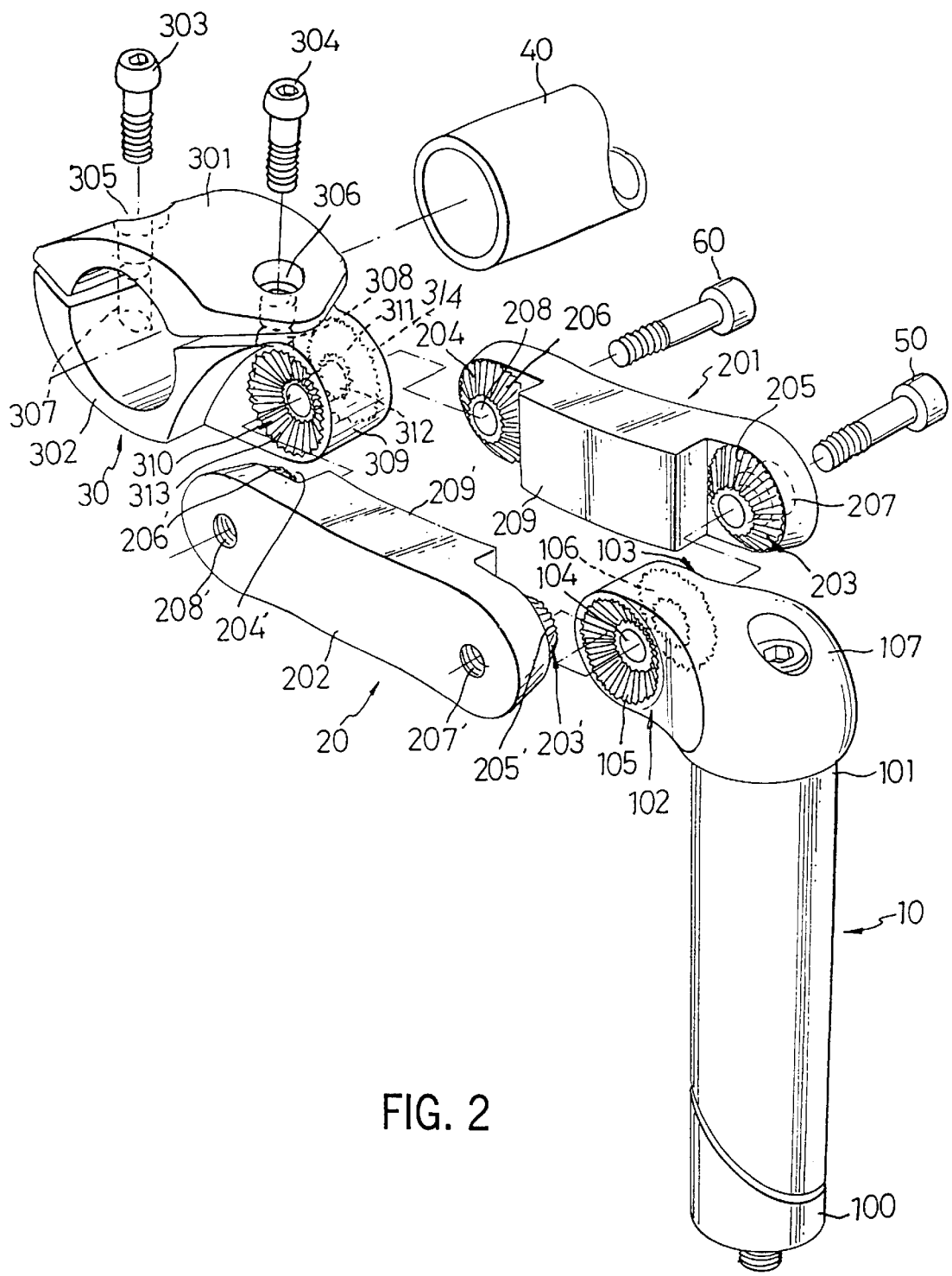
FIG. 2 is an exploded perspective view of an improved stem according to the present invention.
Figure 3:
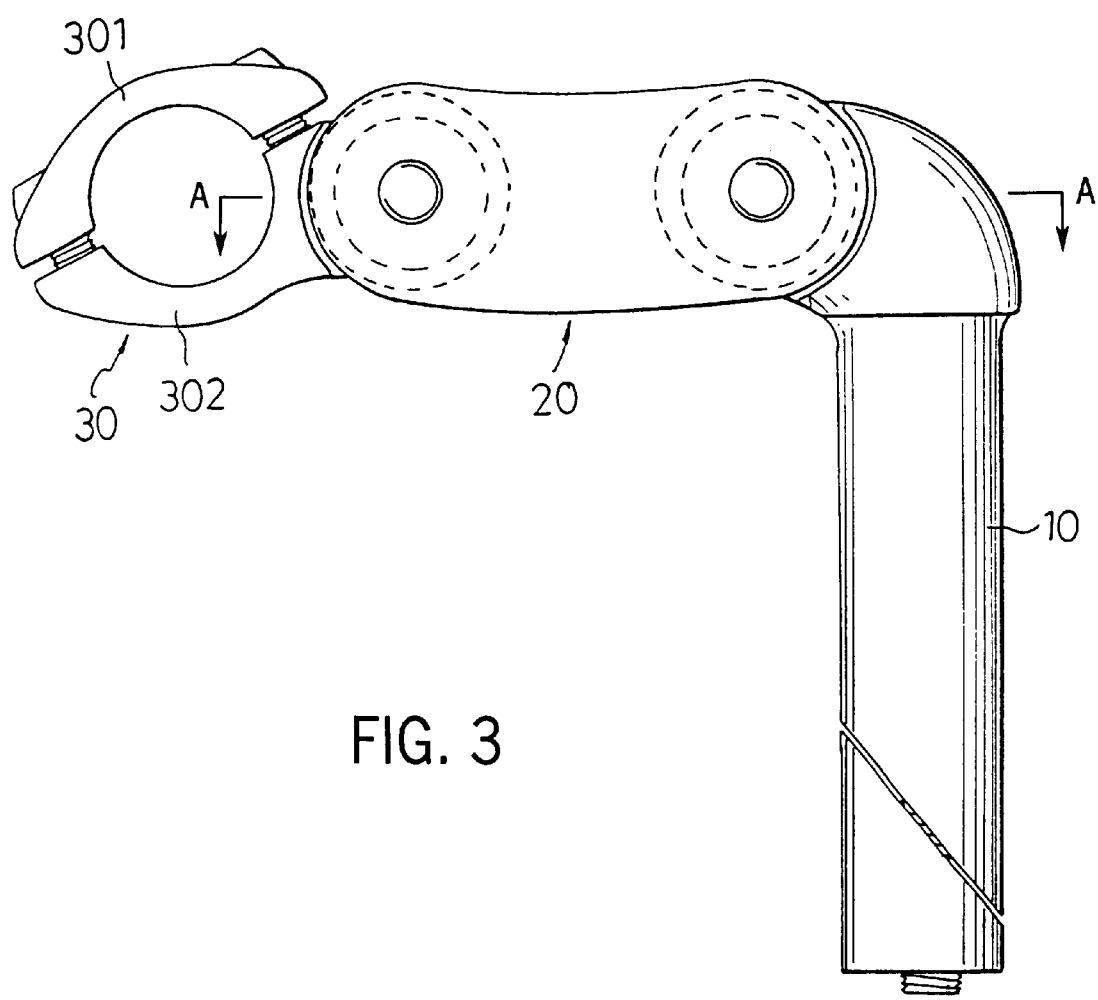
FIG. 3 shows the improved stem according the present invention in assembled form.

Referring now to FIGS. 2 and 3, the improved stem for a bicycle according to present invention comprises a column member 10 having a lower portion 100 for fixedly inserting into the fork tube (not shown), a lateral member 20 and a sleeve member 30.

The column member 10 has a top end 101. A first pivot mechanism 102 and a second pivot mechanism 103 which are the same in terms of structure and shape are provided on the two sides of a rod 107 laterally extended from the top end 101, respectively. The first and second pivot mechanisms 102,103 are of a concave configuration. A hole 104 is in communication with the first pivot mechanism 102 and the second pivot mechanism 103. The surface of the first pivot mechanism 102 and the surface of the second pivot mechanism 103 each include a plurality of teeth 105,106.

The lateral member 20 includes a left connecting part 201 and a right connecting part 202. The left connecting part 201 has two ends each having a protruded engaging mechanism 203 (204) on which a plurality of teeth 205,206 are radially arranged. The protruded engaging mechanisms 203,204 are of a convex configuration. The two protruded engaging mechanisms 203,204 include holes 207,208 at the center thereof, respectively. A middle part 209 is provided between the two protruded engaging mechanisms 203,204. The right connecting part 202 has the same structure and configuration as the left connecting part 201 except that the two protruded engaging mechanisms 203', 204' of the right connecting part 202 define threaded openings 207', 208', respectively.

The sleeve member 30 for fixing a handlebar 40 includes an upper cover 301 and a lower cover 302. The upper cover 301 is assembled with the lower cover 302 by two bolts 303,304 that are passed through holes 305,306 provided on the upper cover 301 and screwed into threaded holes 307, 308 provided on the lower cover 302. The handlebar 40 is clamped between the upper cover 301 and the lower cover 302. Most notably, from the lower cover 302 extends a rod 309 which defines a third pivot mechanism 310 and fourth pivot mechanisms 311 on two sides thereof, respectively. The third and fourth pivot mechanisms 310,311 are identical to the first and second pivot mechanisms 102,103 in terms of structure and configuration. A hole 312 communicates between the third pivot mechanism 310 and the fourth pivot mechanism 311. The surface of the third pivot mechanism 310 and the surface of the fourth pivot mechanism 311 each include a plurality of teeth 313,314. It should be noted that the third pivot mechanism 310 and the fourth pivot mechanism 311 are identical to the first pivot mechanism 102 and the second pivot mechanism 103 in terms of structure and configuration.

In assembly, the two protruded engaging mechanisms 203,203' of the left connecting part 201 and right connecting part 202 are respectively disposed onto the first and second pivot mechanisms 103,102, while the two protruded engaging mechanisms 204, 204' are respectively disposed onto the third and fourth pivot mechanisms 311,310. A bolt 50 is passed through the holes 207,104 and screwed into the threaded aperture 207 so that the teeth 205,205' are in secured engagement with the teeth 105,106. Thus, the left connecting part 201 and the right connecting part 202 are attached to the column member 10. Another bolt 60 is passed through the holes 208,312 and screwed into the threaded aperture 208' so that the teeth 206,206' are in fixed engagement with the teeth 313,314. The sleeve member 30 is thus attached to the left connecting part 201 and the right connecting part 202. The middle part 209 of the left connecting part 201 contacts the middle part 209 of the right connecting part 202.

Figure 4:
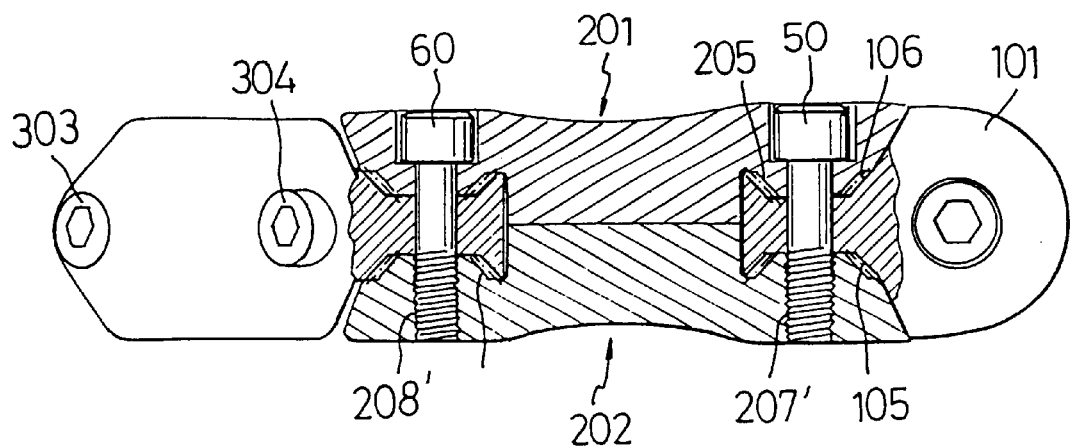
FIG. 4 is a cross-sectional view taken along the line A—A in FIG. 3.
Figure 5:
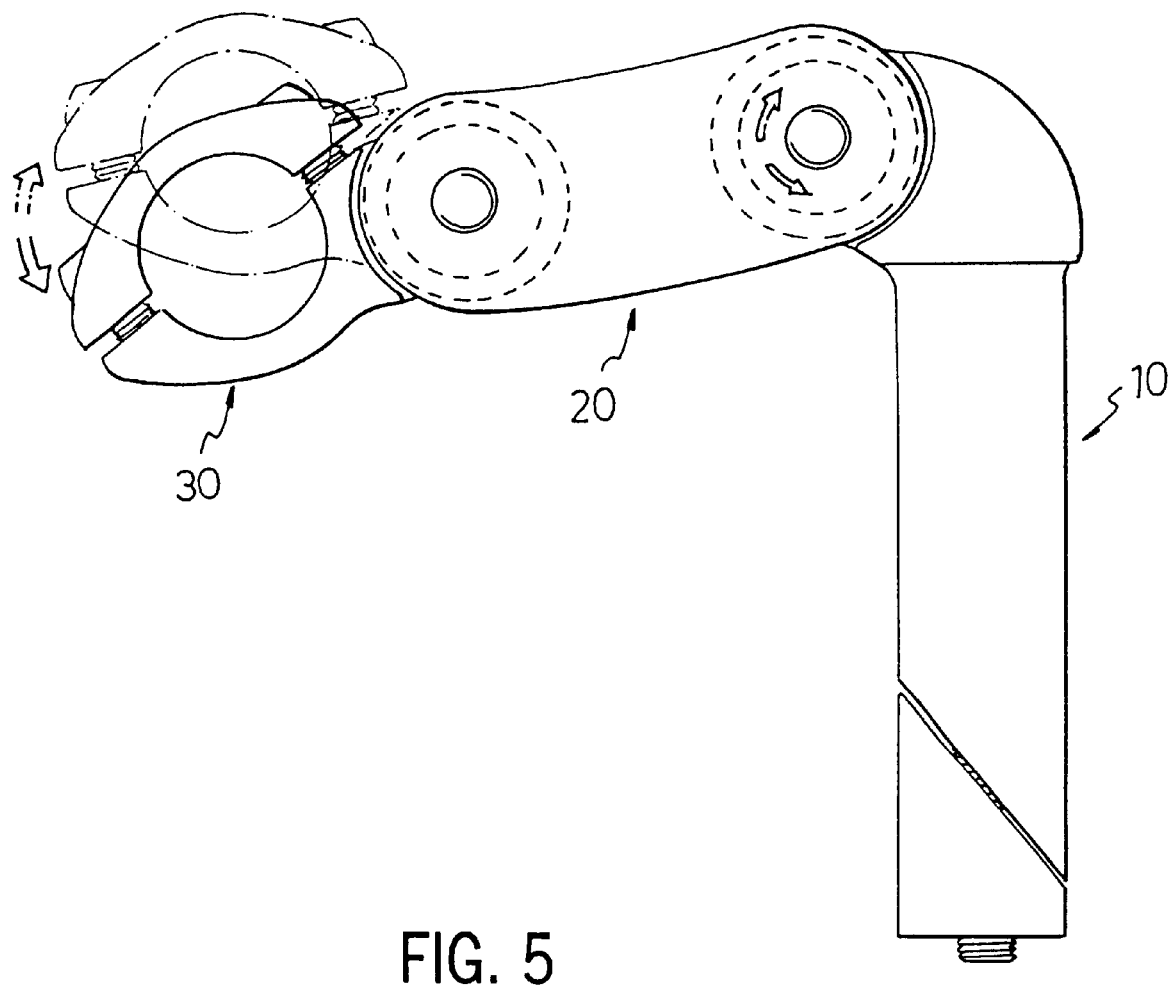
FIG. 5 is a schematic view of an improved stem according to the present invention showing the adjustment of the lateral member to a different angle.

In the adjustment operation of the angle between the column member 10 and the lateral member 20, the bolt 50 is loosened to enable the disengagement of the teeth 205, 205' from the teeth 106,105, and then the angle between the lateral member 20 and the column member 10 is adjusted to the desired angle (see FIG. 4 and FIG. 5). Thereafter, the bolt 50 is tightened. Thus, the adjustment of the angle is easily achieved. Likewise, the height of the handlebar 40 can be adjusted by loosening the bolt 60 to enable the disengagement of the teeth 206,206' from the teeth 314,313 so that the sleeve member 30 can be pivoted around the bolt 60 to the desired position.

In view of the foregoing, this invention provides easy and convenient adjustment of the angle between the column member 10 and the lateral member 20, and the angle of the handlebar 40 by operating the bolts 50, 60, respectively.

While there is shown and described herein certain specific structures embodying the present invention, it will be apparent to those skilled in the art that various modification and rearrangements of the parts may be made without departing from the spirit and scope of the underlying inventive concept.

What is claimed is:

1. A stem for a bicycle adapted for use in mounting a handlebar on the bicycle, said stem comprising:

a column member adapted to be mounted on the bicycle, said column member having a top end, a first pivot mechanism and a second pivot mechanism which are provided on two sides of the top end respectively, wherein the first and the second pivot mechanisms are of a concave configuration and have a hole therebetween, the first and second pivot mechanisms also each possessing a surface bearing a plurality of teeth;

a sleeve member adapted for mounting the handlebar, said sleeve member having an extension therefrom which defines a third pivot mechanism and a fourth pivot mechanism on the two sides thereof, respectively; and a lateral member including a left connecting part and a right connecting part wherein each of the left and right connecting part has two ends each having a protruded engaging mechanism adapted to be pivotally attached to the first, second, third and fourth pivot mechanisms so that the lateral member can be pivotally adjusted through the first and second pivot mechanisms, and the sleeve member can be pivotally adjusted through the third and fourth pivot mechanisms.

2. A stem for a bicycle as claimed in claim 1, wherein the third and fourth pivot mechanisms are of a concave configuration and have a hole therebetween, the third and fourth pivot mechanisms also each possessing a surface bearing a plurality of teeth.

3. An improved stem for a bicycle as claimed in claim 2, wherein each of the protruded engaging mechanisms of the left connecting part includes a hole at the center thereof, and each of the two protruded engaging mechanisms of the right connecting part defines a threaded opening.

4. An improved stem for a bicycle as claimed in claim 2, wherein a middle part is provided between the two protruded engaging mechanisms of the left connecting part, and another middle part is provided between the two protruded engaging mechanisms of the right connecting part.

5. An improved stem for a bicycle as claimed in claim 1, wherein the protruded engaging mechanisms are of a convex configuration.

6. An improved stem for a bicycle as claimed in claim 1, wherein each of the protruded engaging mechanisms of the left connecting part includes a hole at the center thereof, and each of the two protruded engaging mechanisms of the right connecting part defines a threaded opening.

7. An improved stem for a bicycle as claimed in claim 1, wherein a middle part is provided between the two protruded engaging mechanisms of the left connecting part, and another middle part is provided between the two protruded engaging mechanisms of the right connecting part.

* * * * *